US012689532B2

(12) United States Patent
Harger et al.

(10) Patent No.: US 12,689,532 B2
(45) Date of Patent: Jul. 21, 2026

(54) SMART CONTRACT ENABLED USER ACCOUNT ACCESS

(71) Applicant: Coinbase, Inc., Oakland, CA (US)

(72) Inventors: Pierce Harger, Chicago, IL (US); Hannah Jin, Campbell, CA (US); Wilson Cusack, Sedgwick, CO (US); Michael Stephen de Hoog, Kailua, HI (US); Santosh Shashank Nagaral, Dublin, CA (US)

( * ) Notice: Subject to any disclaimer, the term of this patent is extended or adjusted under 35 U.S.C. 154(b) by 124 days.

(21) Appl. No.: 18/589,250

(22) Filed: Feb. 27, 2024

(65) Prior Publication Data

US 2025/0274296 A1      Aug. 28, 2025

(51) Int. Cl.
*G06Q 20/10* (2012.01)
*H04L 9/00* (2022.01)
*H04L 9/32* (2006.01)

(52) U.S. Cl.
CPC .............. *H04L 9/50* (2022.05); *G06Q 20/10* (2013.01); *H04L 9/3213* (2013.01)

(58) Field of Classification Search
CPC .......... H04L 9/50; H04L 9/3213; G06Q 20/10
See application file for complete search history.

(56) References Cited

U.S. PATENT DOCUMENTS

2022/0270725 A1* 8/2022 DeRosa-Grund ... G06F 16/2365
2022/0327529 A1* 10/2022 Williams .................. H04L 9/50

2023/0259640 A1* 8/2023 Metzler ............... G06F 21/6218
                                                        713/191
2023/0298001 A1* 9/2023 Jethmalani ............. G06Q 20/36
                                                        705/65
2023/0385965 A1* 11/2023 Jacobson ............... G06Q 50/16
2024/0185223 A1* 6/2024 McGARITY ......... H04L 9/3239
2024/0195619 A1* 6/2024 Collen ...................... H04L 9/50
(Continued)

OTHER PUBLICATIONS

"International Search Report and Written Opinion of the International Searching Authority," issued in connection with Int'l Appl. No. PCT/US2025/017236, dated May 26, 2025 (13 pages).

(Continued)

*Primary Examiner* — Lynn D Feild
*Assistant Examiner* — Vladimir I Gavrilenko
(74) *Attorney, Agent, or Firm* — Holland & Hart LLP

(57) ABSTRACT

Methods, systems, and devices for smart contract enabled user account access are described. A client application transmits, to a custodial token platform, a request to use a first amount of tokens associated with a user account at the custodial token platform for transacting with a blockchain address via a blockchain network. The client application receives a withdrawal message that is signed by a key associated with the custodial token platform. The client application broadcasts, via the blockchain network, a message including the signed withdrawal message. The message causes, within a single message on the blockchain network, withdrawal of the first amount of the tokens from a first smart contract address associated with the custodial token platform to a second smart contract address associated with a user of the user account and transfer of a second amount of tokens from the second smart contract address to the blockchain address.

20 Claims, 10 Drawing Sheets

(56) References Cited

U.S. PATENT DOCUMENTS

2024/0372729 A1\*  11/2024  Nahapetyan .......... H04L 9/3234
2025/0225505 A1\*   7/2025  Andon ................. G06Q 20/065

OTHER PUBLICATIONS

Buterin et al. "ERO-4337: Account Abstraction Using Alt Mempool", Ethereum Improvement Proposals, Sep. 29, 2021. Retrieved from the Internet: https://eip.info/eip/4337 (38 pages).

\* cited by examiner

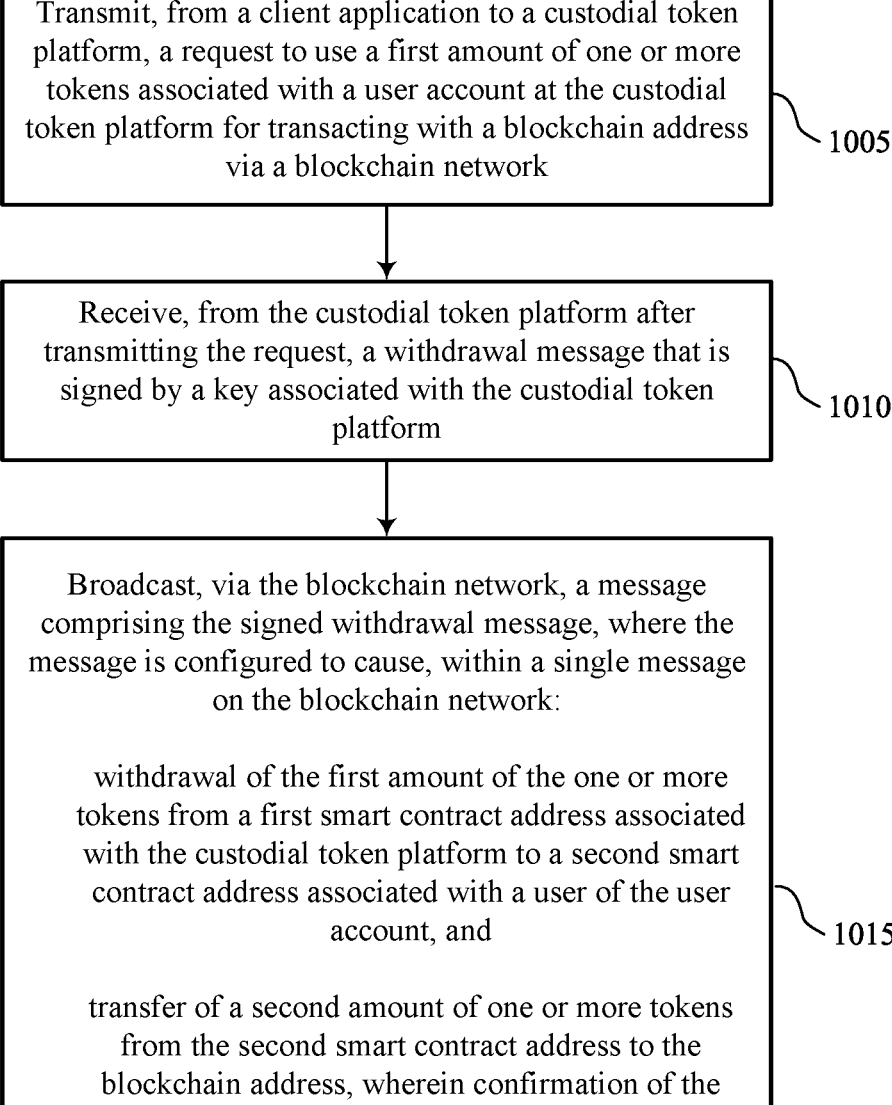

Transmit, from a client application to a custodial token platform, a request to use a first amount of one or more tokens associated with a user account at the custodial token platform for transacting with a blockchain address via a blockchain network

1005

Receive, from the custodial token platform after transmitting the request, a withdrawal message that is signed by a key associated with the custodial token platform

1010

Broadcast, via the blockchain network, a message comprising the signed withdrawal message, where the message is configured to cause, within a single message on the blockchain network:

withdrawal of the first amount of the one or more tokens from a first smart contract address associated with the custodial token platform to a second smart contract address associated with a user of the user account, and transfer of a second amount of one or more tokens from the second smart contract address to the blockchain address, wherein confirmation of the transfer occurs prior to the user account being deducted the first amount of the one or more tokens at the custodial token platform

SMART CONTRACT ENABLED USER ACCOUNT ACCESS

FIELD OF TECHNOLOGY

The present disclosure relates generally to data management, including techniques for smart contract enabled user account access.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

BRIEF DESCRIPTION OF THE DRAWINGS

FIG. 10 shows a flowchart illustrating methods that support smart contract enabled user account access in accordance with aspects of the present disclosure.

DETAILED DESCRIPTION

Figure 1:
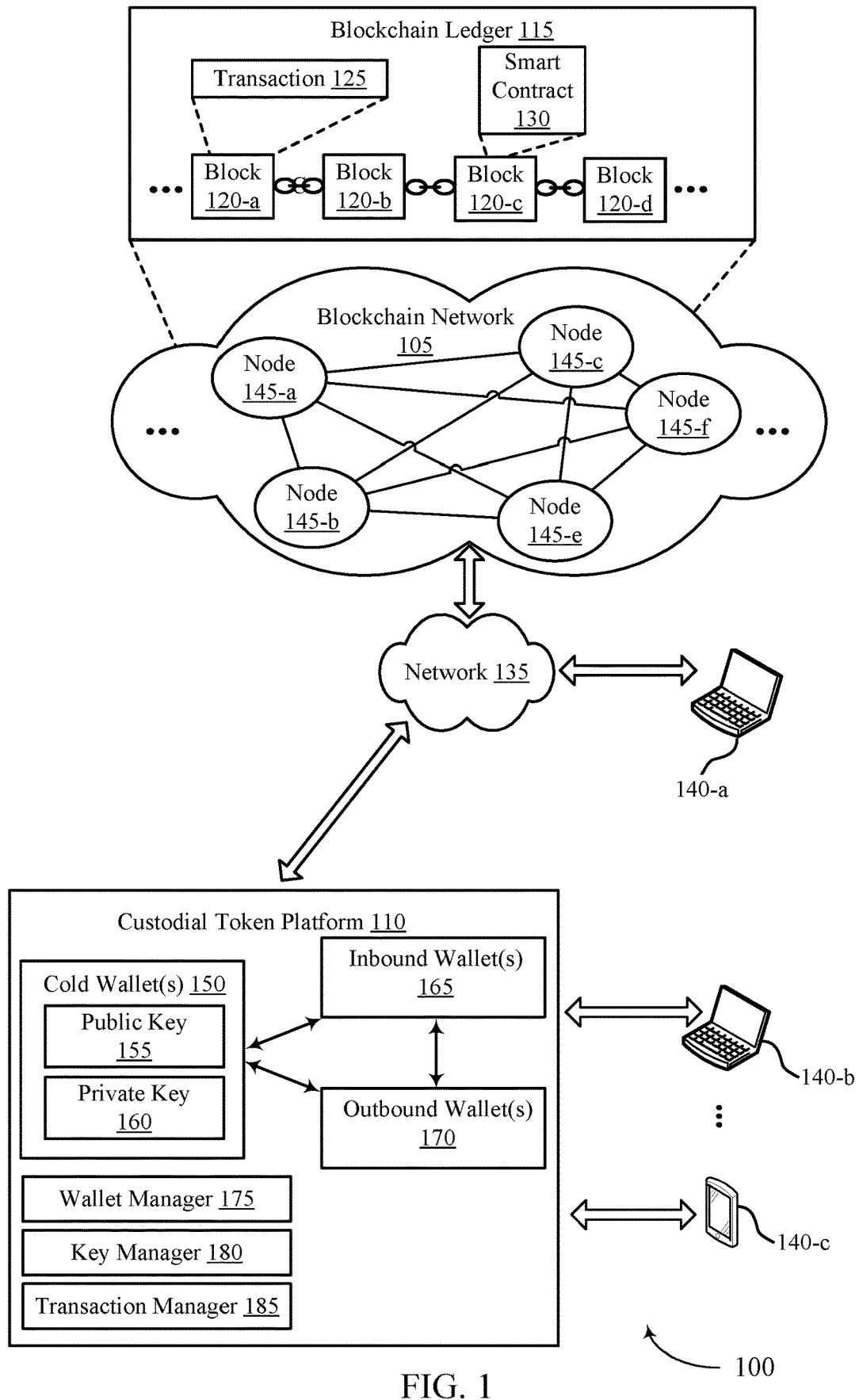
FIG. 1 illustrates an example of a computing environment that supports smart contract enabled user account access in accordance with aspects of the present disclosure.

In some cases, users access various applications to buy, sell, create, trade, and otherwise transact with blockchain addresses. For example, users may access marketplaces to perform a transfer of funds between blockchain addresses in a transaction, such as when a first user associated with a first user blockchain address purchases a non-fungible token (NFT) in a marketplace from a second user or service associated with a second blockchain address. In some cases, the first user initiating the transfer of funds, such as by requesting to purchase the NFT from the second user, may access tokens (e.g., Ethereum (ETH)) in the first user blockchain address to cover both a transaction value (e.g., cost of the NFT) and the gas required to complete the transaction (e.g., blockchain fees associated with executing the purchasing transaction). However, the first user blockchain address may not have enough tokens to cover the cost of the transaction value and/or the gas. In such cases, the user may perform multiple operations to add more tokens to the user blockchain address. For example, the user may access a user account (e.g., a custodial account) at a custodial token platform and initiate a transfer of more tokens to the first user blockchain address, and then initiate the purchasing transaction. However, these operations may incur additional gas fees and may be associated with additional processing/resource overhead, as the transfer to the user blockchain address from the user account and the transfer of the tokens to the second blockchain address for the purchase transaction may require verification by the blockchain network nodes. Additionally, as verification of multiple transactions may take some time, this may result in undesirable user experience.

Similarly, and as another example, the first user may request to send tokens, such as a stablecoin (e.g., USDC) to a third user associated with a third user blockchain address, and the transfer of USDC from the first user blockchain address to the third user blockchain address may also involve multiple operations for the transfer of USDC and for paying gas. For example, the multiple operations may involve adding USDC into the first user blockchain address from the user account, waiting for the transfer of USDC to the user account to settle, adding ETH into the first user account (e.g., for purchasing the NFT and/or for paying gas), waiting for the ETH to settle, and so forth. The first user performing multiple operations or steps may increase time for completing the transaction, as well as reduce user experience due to inefficiencies associated with performing the multiple operations.

Techniques described herein address these difficulties by providing a technique for smart contract enabled access to a user account at a custodial token platform. The first user (e.g., user sending a request for a transaction, such as purchasing an NFT from the marketplace) may access a client application, such as an application associated with the first user blockchain address or a client application (e.g., browser) configured to access a service (e.g., Web3 service) associated with transacting via a blockchain network. For example, the client application may be a browser supported self-custody wallet application and the application may be connected with (e.g., configured to transact with) a Web3 service supported at a website. The user may input, into the client application, information to initiate a transfer to the second blockchain address. For example, the user may access the user interface of the client application and/or service to authenticate to the custodial token platform and to input information associated with the transfer (e.g., the receiver address, amount of tokens, type of transfer). The client application may transmit a request to use a first amount of one or more tokens (e.g., ETH) associated with the first user account at the custodial token platform for transacting with the second user blockchain address (e.g., of the second user account selling the NFT) via the blockchain network.

The client application may receive, from the custodial token platform, a withdrawal message that is signed by a key associated with the custodial token platform. The client application may then generate and broadcast a message (or transmit the message for broadcast) that is configured to cause a withdrawal of tokens from a first smart contract address associated with the custodial token platform to a second smart contract address associated with the user of the user account, and transfer a second amount of tokens from the second smart contract address to the second blockchain address (e.g., of the second user or service selling the NFT). The broadcast message may include the signed withdrawal messages such as to facilitate transfer from the first smart contract address associated with the custodial token platform. That is, the first smart contract may be configured to verify or validate the signature before initiating the transfer. Moreover, the custodial token platform may leverage the first user's off-chain accounts (e.g., retail balances, not associated with the blockchain, debit bank account) for the blockchain transaction. That is, after or in response to receiving the request and transmitting the withdrawal message, the custodial token platform may place a hold on the user account until the transfer is complete. After which, the custodial token platform may debit the user account to cover the cost of the transfer. In some examples, transfer of the funds from the first smart contract address to the second smart contract address and to the second blockchain address may be performed in a bundled manner, such as to further improve transfer validation time. Leveraging bundled transactions and smart contract addresses (e.g., associated with smart contract wallets) may facilitate cost efficient techniques to withdraw funds from the first user account associated with the custodial token platform to use the funds in a single transaction. In this manner, the smart contract addresses associated with the custodial token platform may facilitate a seamless single-step transaction covering costs of the transaction and/or gas even if the first user blockchain address has insufficient quantity of tokens (e.g., ETH) to cover the costs of the transaction.

FIG. 1 illustrates an example of a computing environment 100 that supports smart contract enabled user account access in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-a, 120-b, 120-c, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-a, 140-b, or 140-c) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-d) of a blockchain ledger (e.g., the blockchain ledger 115) of transactions after verification of the transaction. Using the implemented consensus mechanism, each node 145 may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a subprogram that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the computing system custodial token platform 110, the blockchain network 105, or both. For example, a user of the computing device 140-a may provide user inputs via the computing device 140-a, which may result in commands, data, or any combination thereof being communicated via the network 135 to the computing system custodial token platform 110, the blockchain network 105, or both. Additionally, or alternatively, a computing device 140-a may output (e.g., display) data or other information received from the custodial token platform 110, the blockchain network 105, or both. A user of a computing device 140-a may, for example, use the computing device 140-a to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, for example, using a smart contract 130 or a decentralized application ("Dapp"). The smart contract 130 or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital assets between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to an external wallet, to deploy a smart contract (e.g., a self-executing program), or to call a smart contract.

Additionally, a user may access various applications and marketplaces to buy, sell, create, trade, and otherwise transact with blockchain addresses. For example, the user may maintain a self-custody wallet that is used to access and transact with a marketplace to perform a transfer of funds between a first user blockchain address associated with the user (e.g., the address of the self-custody wallet) and a second blockchain address associated with a second user or the marketplace service in order to purchase an item or service from the second blockchain address, such as purchasing an NFT. In some cases, however, the user may not have enough funds at the first blockchain address to support the purchase and/or transfer (e.g., gas or transaction fees), but the user may have an account at the custodial token platform 110 with enough funds to facilitate the transfer. However, to support such a transfer, typically the user would have to access the account at the custodial token platform 110, transfer funds from the account to the first blockchain address, and then transfer the funds from the first blockchain address to the second blockchain address. Each of these transactions may require fees and validation on the blockchain network 105 before the transfer is complete. Thus, these operations may result in increased transaction fees, undesirable user experience, and increased processing resource overhead on the blockchain network (e.g., due to validation of multiple transactions).

As described herein, the custodial token platform 110 may implement and support a smart contract 130 enabled user account access to address these difficulties. The first user (e.g., user sending a request for a transaction, such as purchasing an NFT from the marketplace) may access a client application (e.g., a self-custody wallet application) associated with the first user blockchain address, and input information to initiate a request to the second blockchain address (e.g., user or service receiving the transfer, such as to facilitate the sale of the NFT). For example, the user may cause transmission of a request from the client application to the custodial token platform 110 and the request may indicate a request to use a first amount of one or more tokens (e.g., ETH) associated with the first user account at the custodial token platform 110 for transacting with the second user blockchain address (e.g., of the second user account selling the NFT) via the blockchain network 105.

The first user account may receive, from the custodial token platform 110 in response to the request, a withdrawal message that is signed by a key associated with the custodial token platform 110. The client application may then transmit a message, that includes the signed withdrawal message, and the message may cause a withdrawal of tokens from a first smart contract address associated with the custodial token platform 110 to a second smart contract address associated with the first user account, and transfer a second amount of tokens from the second smart contract address to the second blockchain address (e.g., of the second user selling the NFT). Moreover, the custodial token platform 110 may leverage the first user's off-chain accounts (e.g., retail balances, not associated with the blockchain, debit bank account) for the blockchain transaction (e.g., to backfill the first smart contract).

Leveraging bundled transactions and smart contract addresses (e.g., associated with smart contract wallets) may facilitate cost efficient and resource efficient techniques to withdraw funds from the first user account associated with the custodial token platform to spend the funds in a single transaction. In this manner, the smart contract addresses associated with the custodial token platform may facilitate a seamless single-step transaction covering costs of the transaction and/or gas even if the first user blockchain address or smart contract wallet has insufficient quantity of tokens (e.g., ETH) to cover the costs of the transaction.

Figure 2:
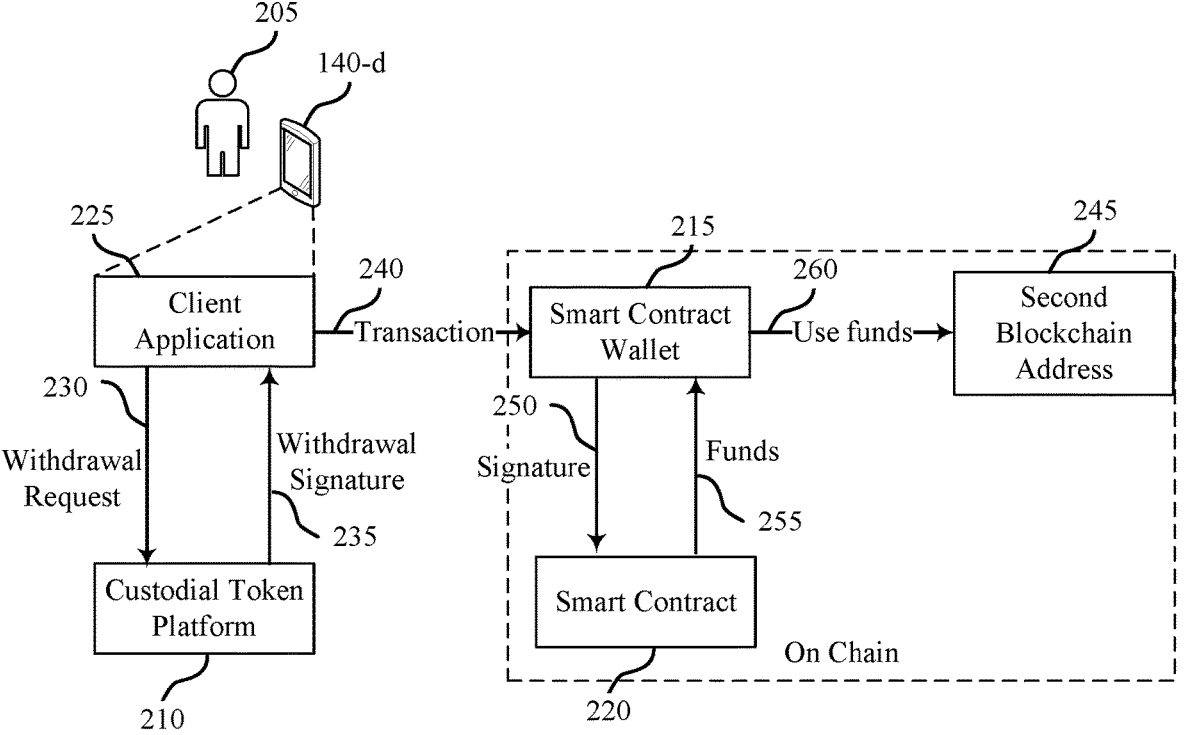
FIG. 2 shows an example of a computing environment that supports smart contract enabled user account access in accordance with aspects of the present disclosure.

FIG. 2 shows an example of a computing environment 200 that supports smart contract enabled user account access in accordance with aspects of the present disclosure. The computing environment 200 may include a user 205 associated with a user device 140-d that provides a user interface to access a client application 225. The computing environment 200 may also include a smart contract wallet 215 and a smart contract 220 associated with the custodial token platform (e.g., custodial token platform 110 of FIG. 1). In some examples, the computing environment 200 may also include a retail account, which may be an off-chain account (e.g., not on blockchain) that is associated with (e.g., via the same user 205) the smart contract wallet 215.

The user 205 may access a Web3 enabled service (e.g., a NFT marketplace) via the user device 140-d and the Web3 enabled service may allow the user to access blockchain enabled features, such as purchasing goods or services via a blockchain network. The user may transact with the service (or with other wallets via the service) by using a self-custodial blockchain wallet application (e.g., a browser extension wallet) and/or via a smart contract wallet (e.g., smart contract wallet 215) that is associated with and/or managed by the user 205. A smart contract wallet is an example of a smart contract, which is managed by the user (e.g., using private keys), that supports self-custody of crypto assets on a blockchain network. The smart contract wallets for users may also support other features such as bundled transactions, customizable recovery options, paying of gas fees using different tokens, privacy and identity management, among other benefits. Thus, the user may hold tokens in the smart contract wallet, rather than or in addition to, a user account at the custodial token platform 210 and/or at a self-custody wallet.

In some cases, the user may wish to use funds associated with the self-custody wallet and or the smart contract wallet to transact with a second blockchain address 245, but the user may not have the funds in the self-custody wallet or the smart contract wallet 215. In such cases, rather than initiating a transfer from another wallet or the user account, the techniques described herein support access of the user account at the custodial token platform 210 to support transfer from the smart contract wallet 215 associated with the user 205 to the second blockchain address 245 via support from the smart contract 220 that is associated with or managed by the custodial token platform 210.

To support such features, the user may access the client application 225, which may be an example of a front-end application or service configured on or accessible via a client application (e.g., a browser accessing a Web3 service). In some cases, the client application 225 may be a service that allows the user 205 to access a user account that is associated with one or more blockchain wallets or off-chain wallets at the custodial token platform 210. That is, the Web3 service may enable the client application 225 for accessing the user account at the custodial token platform 210 to facilitate other Web3 services. For example, the client application 225 may enable the user 205 to access a marketplace for purchasing assets, such as for minting an NFT. Accordingly, the user 205 may access the user account at the custodial token platform 210 to pay a quantity of tokens and/or pay a gas fee to perform the transaction. The user 205 may first authenticate in the client application 225 and then request the custodial token platform 110 to provide tokens for minting the NFT.

To support such services, the user 205 may access the client application 225 to request user of user account funds at the custodial token platform. The client application 225 may prompt for and receive information to facilitate transfer to the second blockchain address, such as authentication information for the user account, second blockchain address 245 information, and the type of transaction (e.g., fees/gas, funds, both fees and funds).

Accordingly, the client application 225 may send a withdrawal request 230 to the custodial token platform 210 (e.g., such as to facilitate completion of the NFT minting transaction). As described, the withdrawal request 230 may include user authentication information and a request to transfer a certain quantity of tokens on a particular network to the second blockchain address 245. The custodial token platform may determine that the user 205 has a sufficient quantity of tokens at the user account or that the user 205 does not have a sufficient quantity of tokens at the user account to pay for the transaction and/or to pay gas. For example, the custodial token platform may determine that the user 205 does or does not have enough USDC to pay for minting the NFT.

In response to the withdrawal request 230, the custodial token platform 210 may place a hold on the funds at the user account at the custodial token platform 210 until transfer of the funds to the second blockchain address 245. That is, the custodial token platform 210 may hold the funds so that the user is not able to withdraw or otherwise use the funds that are intended for fulfilling the transfer. Additionally, the custodial token platform 210 may provide a withdrawal message to the user 205 after performing authorization of the user based on credential information at the client application 225, the type of asset the user 205 is attempting to withdraw from the user account (e.g., USDC, ETH, etc.), the account to which the user is withdrawing, time period for which the withdrawal message is valid, and the like. The withdrawal message 235 may be signed by a key associated with the custodial token platform 210.

After receiving the withdrawal message 235, the client application 225 may be configured to generate and broadcast (or transfer to cause broadcast) a message 240 (e.g., a transaction) via the blockchain network to facilitate the transfer to the second blockchain address 245. The message may include the withdrawal message received from the custodial token platform 210. On chain (e.g., on the blockchain network), the message 240 may cause the smart contract wallet 215 associated with the user 205 to "pull" funds from the smart contract 220 by transferring the withdrawal message with the signature to the smart contract 220 at 250. The smart contract 220 may validate the signature and transmit the requested funds to the smart contract wallet 215 via the blockchain network at 255. The smart contract wallet 215 may transfer the funds to the second blockchain address 245 via the blockchain network at 260. After the transfer is validated on the blockchain network, the custodial token platform 210 may debit, deduct, or withdraw from the user account and release the hold and the funds. That is, the custodial token platform 210 may, in response to receiving the withdrawal request 230, implement techniques (e.g., using a block processor or indexer) to monitor the blockchain network for confirmation of the transaction.

The smart contract 220 managed by or associated with the custodial token platform 210 may be an example of a Ethereum ERC-4337 paymaster. ERC-4337 may be standard for account abstraction in the Ethereum blockchain. A paymaster may be a smart contract account that facilitates account abstraction and transaction sponsorship (e.g., gasless transactions). Additionally, the techniques described herein support transaction bundling that allows the signature transfer at 250, the fund withdrawal at 2355, and the transfer of funds to the second blockchain address 245 to occur using a single transaction on the blockchain network. The single transaction may include multiple sub-events for each of these operations, and bundling the operations under a single transaction may result in reduced gas fees and more efficient transaction broadcast and validation. That is, the blockchain network nodes may be configured to validate the single transaction (including multiple events) rather than multiple different transactions at different times. As such, these techniques may support improved user experience in addition to improved network efficiencies.

As described herein, the smart contract wallet 215 associated with the user 205 may be managed by the user 205. In some examples, if the user does not have a smart contract wallet, the custodial token platform 210 may implement a service to support deployment of the smart contract wallet 215 on behalf of the user. As such, in response to the withdrawal request 230 the user may input information to cause deployment of the smart contract wallet 215 on the blockchain network, and the custodial token platform 210 may provide information (e.g., keys) for the user to manage the smart contract wallet 215.

Thus, the techniques described herein may enable the user to effectively pay from the smart contract 220 via the smart contract wallet 215 associated with the custodial token platform. The broadcasted message 240 may effectively provide a "pull" function at the smart contract 220, which functionally allows the user to pull funds from their account at the custodial token platform 210. Accordingly, these techniques may support the user account at the custodial token platform 210 being available on-chain, even though the account is technically off-chain.

Figure 3:
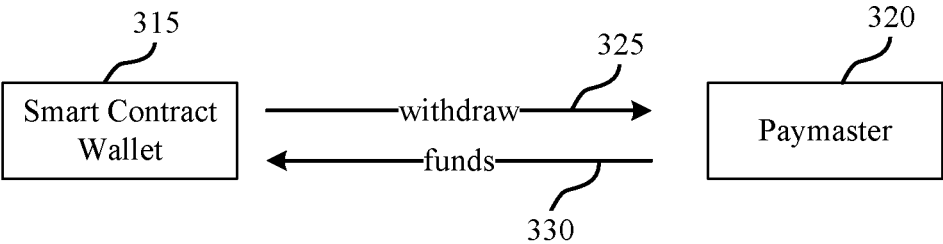
FIG. 3 shows an example process flow for transfer funds that supports smart contract enabled user account access in accordance with aspects of the present disclosure.

FIG. 3 shows an example process flow for transfer of funds 300 that supports smart contract enabled user account access in accordance with aspects of the present disclosure. More specifically, FIG. 3 illustrates examples operations for transfer of funds (without gas) using a paymaster smart contract (e.g., smart contract 220 of FIG. 2), which may be an example of ERC-4337 compliant smart contract. As illustrated in FIG. 2, the smart contract wallet 215 may receive a message (e.g., from client application 225 of FIG. 2) broadcast via the blockchain network, and the message may include a withdrawal signature signed by the custodial token platform that is associated with (e.g., manages) the paymaster contract 320. At 325, the smart contract wallet 315 may pass the withdrawal signature to the paymaster contract 320, and the paymaster smart contract 320 may validate the withdrawal signature and transfer the funds to the smart contract wallet 315 at 330. Thus, the smart contract wallet 315 may pull funds from a paymaster smart contract 320 (e.g., smart contract 220 of FIG. 2) based on information received (e.g., cost for transaction, gas fee, etc.) via the message transmitted by the client application based on the information input by the user. The withdraw message at 325 and the funds transfer 330 (in addition transfer of funds to a second blockchain address) may be performed in a batched manner (e.g., batch messages, batch events, batch transactions). In the example of FIG. 3, the smart contract wallet 315 may pay the transaction fees (e.g., gas fees) for transfer of funds.

Figure 4:
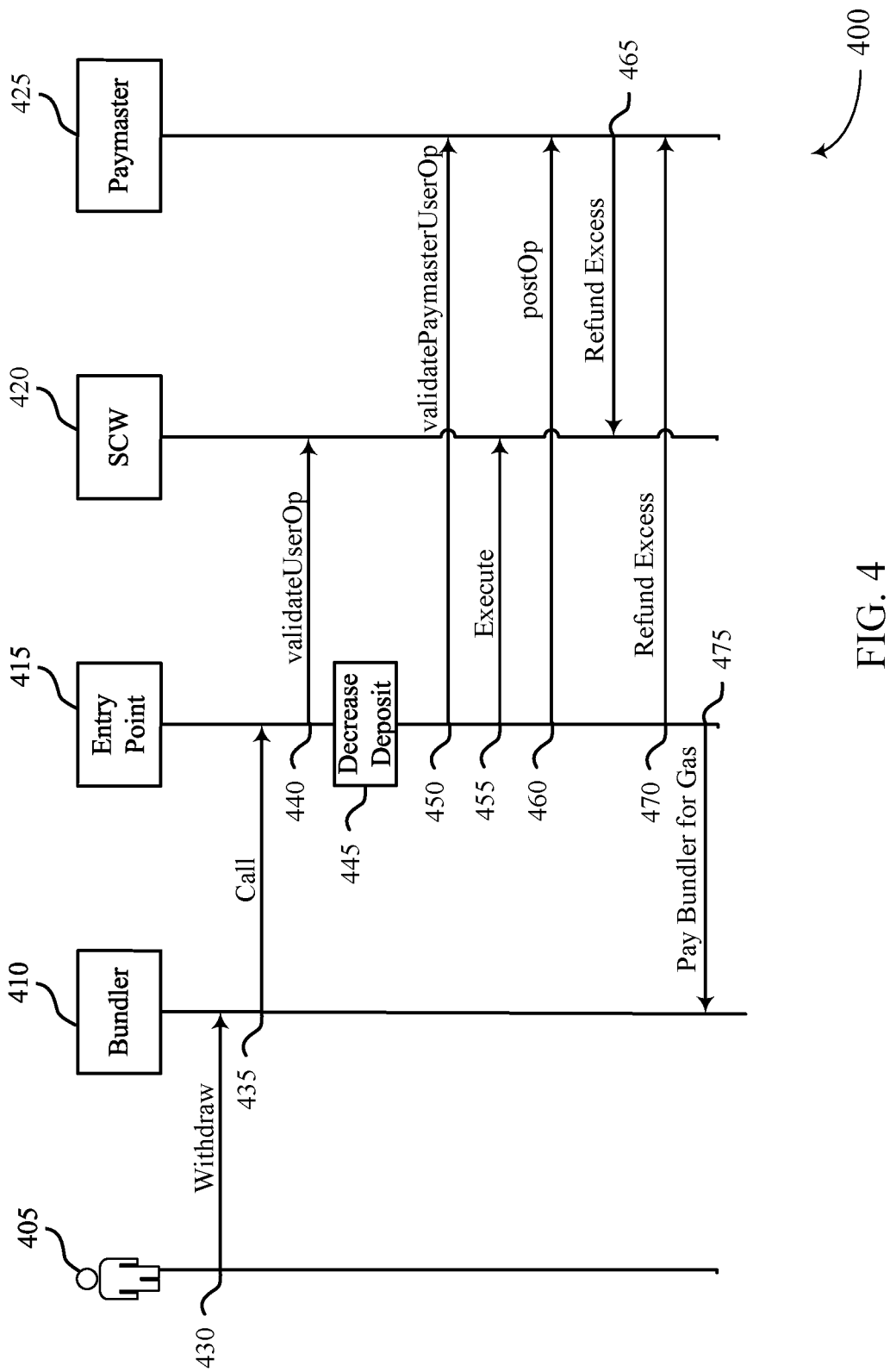
FIG. 4 shows an example process flow for paying gas that supports smart contract enabled user account access in accordance with aspects of the present disclosure.

FIG. 4 shows an example process flow 400 for paying gas that supports smart contract enabled user account access in accordance with aspects of the present disclosure. The process flow 400 includes a user 405 and various on-chain components for supporting paying gas in accordance with aspects of the present disclosure, such as a bundler 410, an entry point smart contract 415, a smart contract wallet 420, and a paymaster contract 425. The smart contract wallet 520 and the paymaster contract 425 may be examples of the smart contract wallet and the smart contract as described with respect to FIGS. 1 through 3. The user 405 may submit, via a client application, a withdrawal message 430 to a bundler 410. The request (e.g., a ERC-4337 operation) may include a data field (e.g., paymasterAndData field) that includes the paymaster contract 425 address and the withdrawal message 430 (e.g., a withdrawal message signed by a custodial token platform as described herein) to pull funds from the paymaster contract 425 in order to pay gas for a transaction.

Based on information included in the withdrawal message 430, the withdrawal message 430 may be routed to a bundler 410. The bundler 410 may be an example of a network node (e.g., a node 145 of FIG. 1) that monitors for user operations (ops) via a special memory pool (mempool) on the blockchain network. A user operation may be an example of a pseudo-transaction object that is application binary interface (ABI) encoded struct that describes a transaction to be sent on behalf of the user. The bundler 410 may use an externally owned account (EOA)) to call, at 435, the entry point smart contract 415 and the call may include information for the bundled transactions. In response to receiving the call from the bundler 410, the entry point smart contract 415 may call, at 440, the smart contract wallet 420 to validate the user operation by sending a validation call. At 445, the entry point smart contract 415 may decrease a paymaster deposit associated with the paymaster contract 425, in the entry point smart contract 415, based on the tokens to pay the gas associated with the transaction. If the paymaster deposit of the paymaster contract 425 is less than the gas fee (e.g., insufficient balance of ETH), the transaction to pay the gas fee may revert.

At 450, the entry point smart contract 415 may also transmit a call, to the paymaster contract 425, to validate the paymaster user operation such as to run validations on the withdrawal, including checking the signature (e.g., of the custodial token platform) and ensuring that the withdrawal value exceeds the maximum cost of gas value of the transaction. At 455, in response to the validation being confirmed, the entry point smart contract 415 may execute a callData command on the smart contract wallet 420, causing the smart contract wallet 420 to perform one or more arbitrary operations on the blockchain. At 460, the entry point smart contract 415 may execute a postOp call to the paymaster contract 425 including the actual gas used in the transaction.

At 465, the paymaster contract 425 may transfer the withdraw value minus actual gas used to the smart contract wallet 420. At 470, the entry point smart contract 415 may refund the paymaster contract 425 if the actual gas used is less than estimated gas at 445. At 475, the entry point smart contract 415 may transfer an amount of the gas to the bundler 410.

Figure 5:
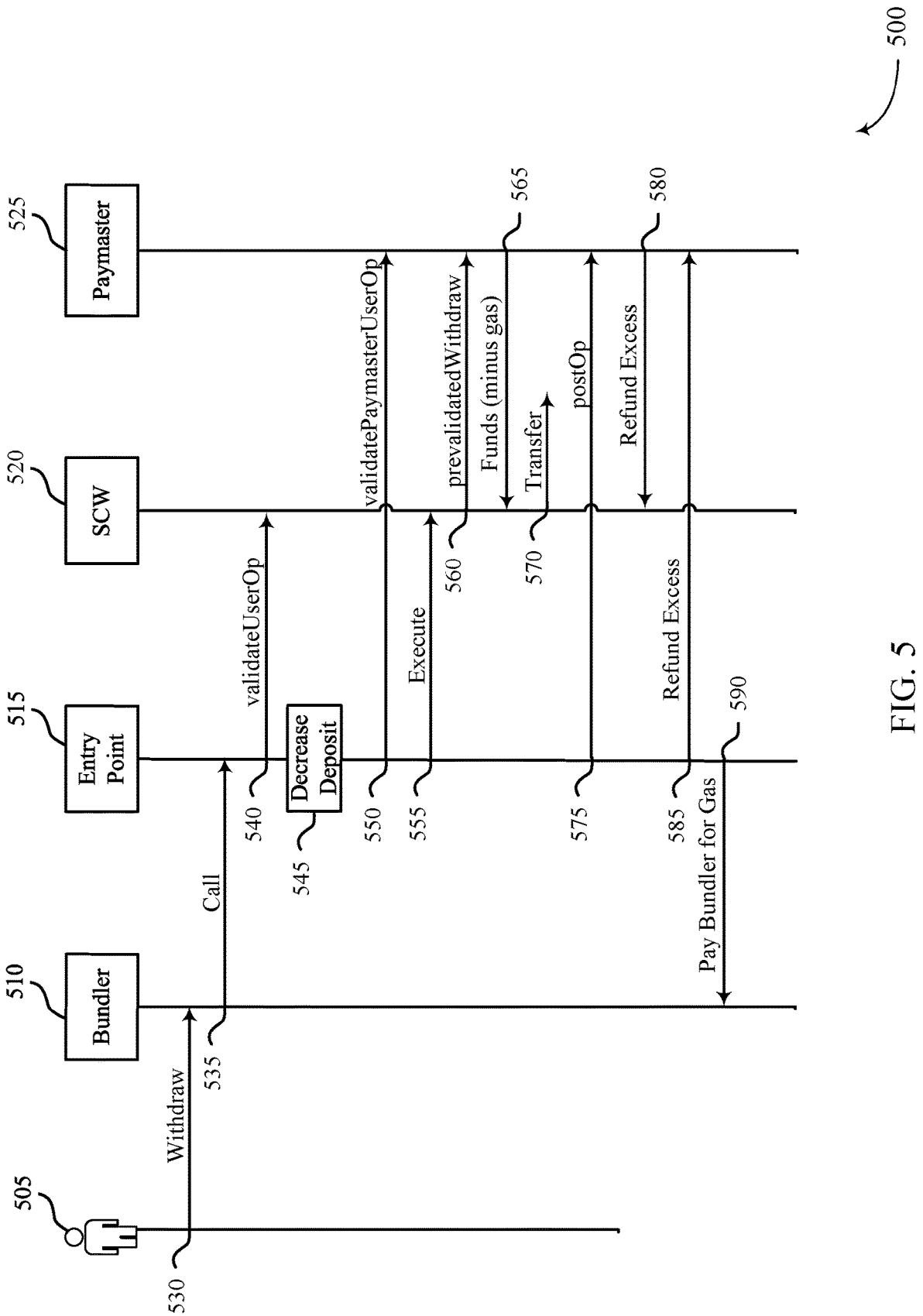
FIG. 5 shows an example process flow for paying gas and transfer of funds that supports smart contract enabled user account access in accordance with aspects of the present disclosure.

FIG. 5 shows an example of a process flow 500 for transfer of funds and to pay gas that supports smart contract enabled user account access in accordance with aspects of the present disclosure. The process flow 500 includes a user 505 and various on-chain components for supporting paying gas in accordance with aspects of the present disclosure, such as a bundler 510, an entry point smart contract 515, a smart contract wallet 520, and a paymaster contract 525, which may be examples of the corresponding aspects of FIG. 4. The smart contract wallet 520 and the paymaster contract 525 may be examples of the smart contract wallet and the smart contract as described with respect to FIGS. 1 through 3. The user 505 may submit, via a client application, a withdrawal message 530 to a bundler 510. The request (e.g., a ERC-4337 operation) may include a data field (e.g., paymasterAndData field) that includes the paymaster contract 525 address and the withdrawal message 530 (e.g., a withdrawal message signed by a custodial token platform as described herein) to pull funds from the paymaster contract 525 in order to pay gas for a transaction.

Based on information included in the withdrawal message 530, the withdrawal message 530 may be routed to a bundler 510. The bundler 510 may call, at 535, the entry point smart contract 515, and the call may include information for the bundled transactions. In response to receiving the call from the bundler 510, the entry point smart contract 515 may call, at 540, the smart contract wallet 520 to validate the user operation by sending a validation call. At 565, the entry point smart contract 515 may decrease a paymaster deposit associated with the paymaster contract 525, in the entry point smart contract 515, based on the tokens and gas associated with the transaction. If the paymaster deposit of the paymaster contract 525 is less than the tokens and gas fee (e.g., insufficient balance of ETH), the transaction to pay the gas fee may revert.

At 545, the bundler 510 may also transmit a call, to the paymaster contract 525, to validate the paymaster user operation such as to run validations on the withdrawal, including checking the signature (e.g., of the custodial token platform) and ensuring that the withdrawal value exceeds the maximum cost of the transfer and the gas value of the transaction. At 555, in response to the validation being confirmed, the entry point smart contract 515 may execute a callData command on the smart contract wallet 520, causing the smart contract wallet 520 to perform one or more arbitrary operations on the blockchain. At 560, the smart contract wallet requests funds via a prevalidatedWithdraw call to the paymaster contract 525. At 565, in response to the call from the smart contract wallet 520, the paymaster contract 525 may provide the funds (minus gas) to the smart contract wallet. At 570, the smart contract wallet 520 may transfer the funds and gas to the intended recipient, such as a second blockchain address for purchasing an NFT. As described herein, at least the operations at 550 through 570 may be bundled by the bundler 510.

At 575, the entry point smart contract 515 may execute a postOp call to the paymaster contract 525 including the actual gas used in the transaction. At 580, the paymaster contract 525 may transfer the withdraw value minus actual gas used to the smart contract wallet 520. At 585, the entry point smart contract 515 may refund the paymaster contract 425 if the actual gas used is less than estimated gas at 545. At 590, the entry point smart contract 515 may transfer an amount of the gas to the bundler 510.

Figure 6:
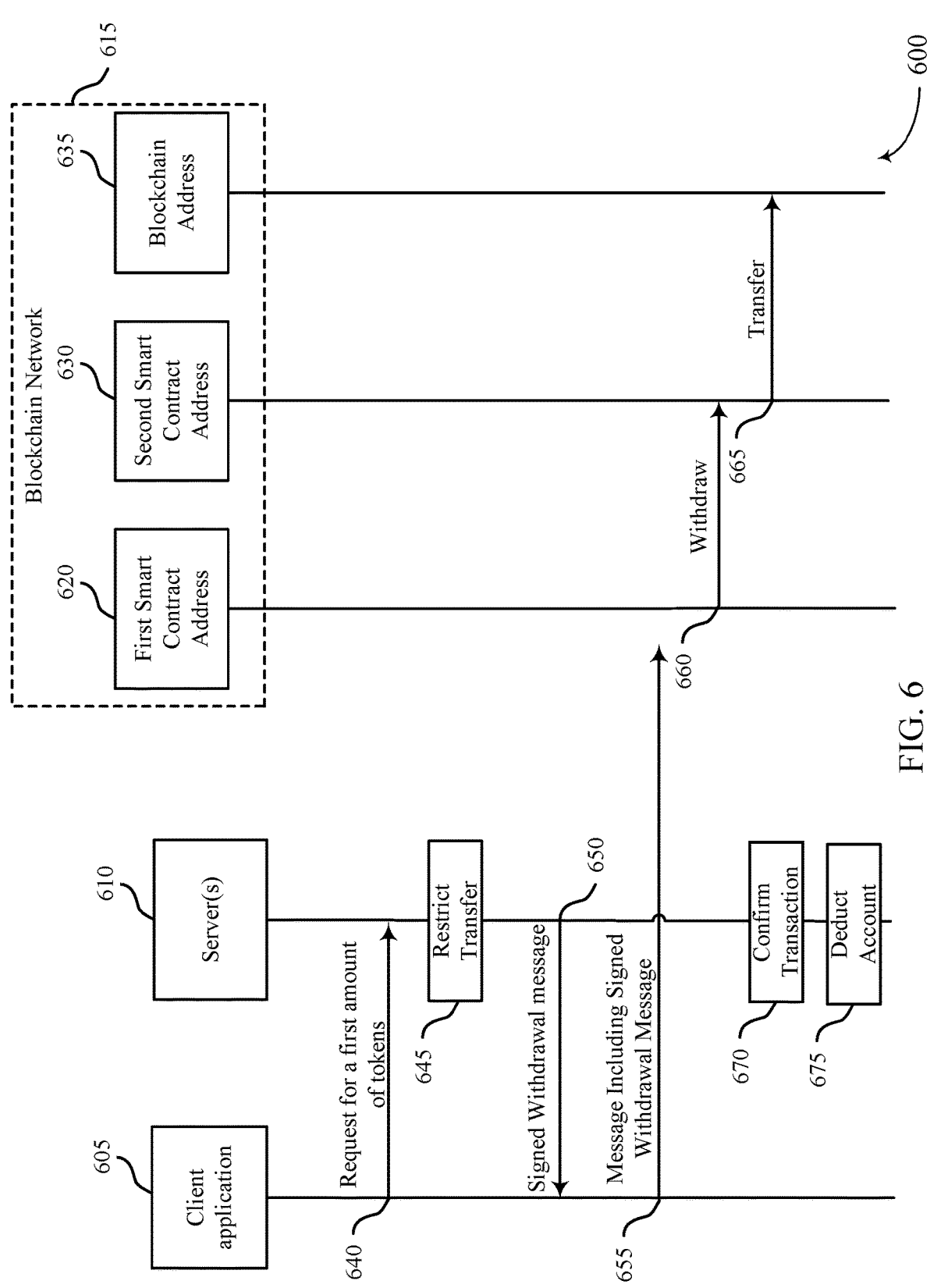
FIG. 6 shows an example of a process flow that supports smart contract enabled user account access in accordance with aspects of the present disclosure.

FIG. 6 shows an example of a process flow 600 that supports smart contract enabled user account access in accordance with aspects of the present disclosure. The process flow 600 includes a client application 605, one or more servers 610, and a blockchain network 615. The blockchain network 615 and client application 605 may be examples of the corresponding aspects described with respect to FIGS. 1 and 2. The one or more servers 610 may be examples of or represent one or more servers that support a custodial token platform as described herein. In the following description of the process flow 600, the operations between the client application 605, the one or more servers 610, and the blockchain network 615 may be transmitted in a different order than the example order shown, or the operations performed may be performed in different orders or at different times. Some operations may also be omitted from the process flow 600, and other operations may be added to the process flow 600.

At 640, the client application 605 may transmit, to the custodial token platform (e.g., via the servers 610), a request to use a first amount of one or more tokens associated with a user account at the custodial token platform for transacting with a blockchain address 635 via a blockchain network 615. At 645, after or in response to receiving the request, the custodial token platform may restrict transfer of the requested amount from the user account. At 650, the client application 605 may receive, from the custodial token platform after transmitting the request, a withdrawal message that is signed by a key associated with the custodial token platform. At 655, the client application 605 may broadcast, via the blockchain network 615, a message including the signed withdrawal message. The message may be configured to cause, within a single message on the blockchain network 105-a, withdrawal, at 660, of the first amount of the one or more tokens from a first smart contract address 620 associated with the custodial token platform to a second smart contract address 630 (e.g., an address of a smart contract wallet) associated with a user of the user account, and transfer, at 665, of a second amount of one or more tokens from the second smart contract address 630 to the blockchain address 635. At 670, the one or more servers 610 (e.g., the custodial token platform) may confirm the transaction including the transfer. At 675, the one or more servers 610 may deduct the amount corresponding to the transaction from the user account at the custodial token platform.

In some examples, the first amount withdrawn from the first smart contract address may include message fees (e.g., gas) associated with the transfer of the second amount to the blockchain address, where the second amount is supplied by the second smart contract address. The first amount withdrawn from the first smart contract address may include the second amount transferred to the blockchain (e.g., the cost of the NFT) address and the second smart contract address may supply message fees (e.g., gas) associated with transacting with the blockchain address.

In some examples, the first amount withdrawn from the first smart contract address may include both the second amount transferred to the blockchain address (e.g., the cost of the NFT) and message fees associated with transfer of the second amount to the blockchain address. The message may be transmitted to a message bundler on the blockchain network 105-a and a field of the message may include an identifier for the first smart contract address and the signed withdrawal message to facilitate the withdrawal and the transfer. In some examples, the request may cause the second smart contract address to be deployed by the custodial token platform. The message may cause transfer of a NFT from the blockchain address to the second smart contract address associated with the user account.

Figure 7:
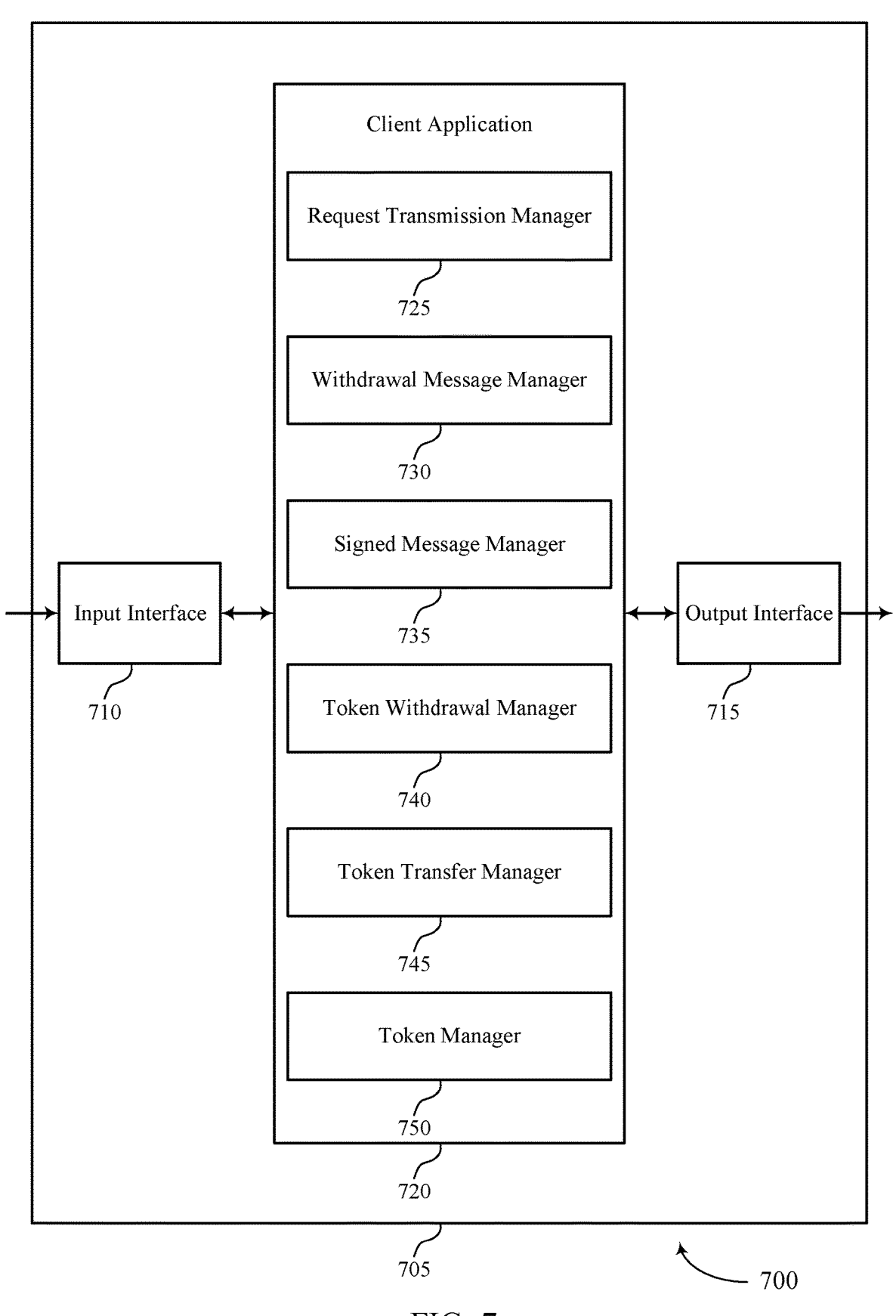
FIG. 7 shows a block diagram of an apparatus that supports smart contract enabled user account access in accordance with aspects of the present disclosure.

FIG. 7 shows a block diagram 700 of a device 705 that supports smart contract enabled user account access in accordance with aspects of the present disclosure. The device 705 may include an input interface 710, an output interface 715, and a client application 720. The device 705, or one or more components of the device 705 (e.g., the input interface 710, the output interface 715, the client application 720), may include at least one processor, which may be coupled with at least one memory, to support the described techniques. Each of these components may communicate, directly or indirectly, with one another (e.g., via one or more buses, communications links, communications interfaces, or any combination thereof).

The input interface 710 may manage input signaling for the user device 705. For example, the input interface 710 may receive input signaling (e.g., messages, packets, data, instructions, commands, transactions, or any other form of encoded information) from other systems or devices. The input interface 710 may send signaling corresponding to (e.g., representative of or otherwise based on) such input signaling to other components of the user device 705 for processing. For example, the input interface 710 may transmit such corresponding signaling to the client application 720 to support smart contract enabled user account access. In some cases, the input interface 710 may be a component of a communication interface 910 as described with reference to FIG. 9.

The output interface 715 may manage output signaling for the user device 705. For example, the output interface 715 may receive signaling from other components of the user device 705, such as the client application 720, and may transmit such output signaling corresponding to (e.g., representative of or otherwise based on) such signaling to other systems or devices. In some cases, the output interface 715 may be a component of a request transmission manager 725 as described with reference to FIG. 9.

For example, the client application 720 may include a request transmission manager 725, a withdrawal message manager 730, a signed message manager 735, a token withdrawal manager 740, a token transfer manager 745, a token manager 750, or any combination thereof. In some examples, the client application 720, or various components thereof, may be configured to perform various operations (e.g., receiving, monitoring, transmitting) using or otherwise in cooperation with the input interface 710, the output interface 715, or both. For example, the client application 720 may receive information from the input interface 710, send information to the output interface 715, or be integrated in combination with the input interface 710, the output interface 715, or both to receive information, transmit information, or perform various other operations as described herein.

The client application 720 may support performing blockchain messages using off-chain accounts in accordance with examples as disclosed herein. The request transmission manager 725 may be configured as or otherwise support a means for transmitting, from a client application to a custodial token platform, a request to use a first amount of one or more tokens associated with a user account at the custodial token platform for transacting with a blockchain address via a blockchain network. The withdrawal message manager 730 may be configured as or otherwise support a means for receiving, from the custodial token platform after transmitting the request, a withdrawal message that is signed by a key associated with the custodial token platform. The signed message manager 735 may be configured as or otherwise support a means for broadcasting, via the blockchain network, a message comprising the signed withdrawal message, wherein the message is configured to cause, within a single message on the blockchain network. The token withdrawal manager 740 may be configured as or otherwise support a means for withdrawal of the first amount of the one or more tokens from a first smart contract address associated with the custodial token platform to a second smart contract address associated with a user of the user account. The token transfer manager 745 may be configured as or otherwise support a means for transfer of a second amount of one or more tokens from the second smart contract address to the blockchain address. The token manager 750 may be configured as or otherwise support a means for wherein confirmation of the transfer occurs prior to the user account being deducted the first amount of the one or more tokens at the custodial token platform.

Figure 8:
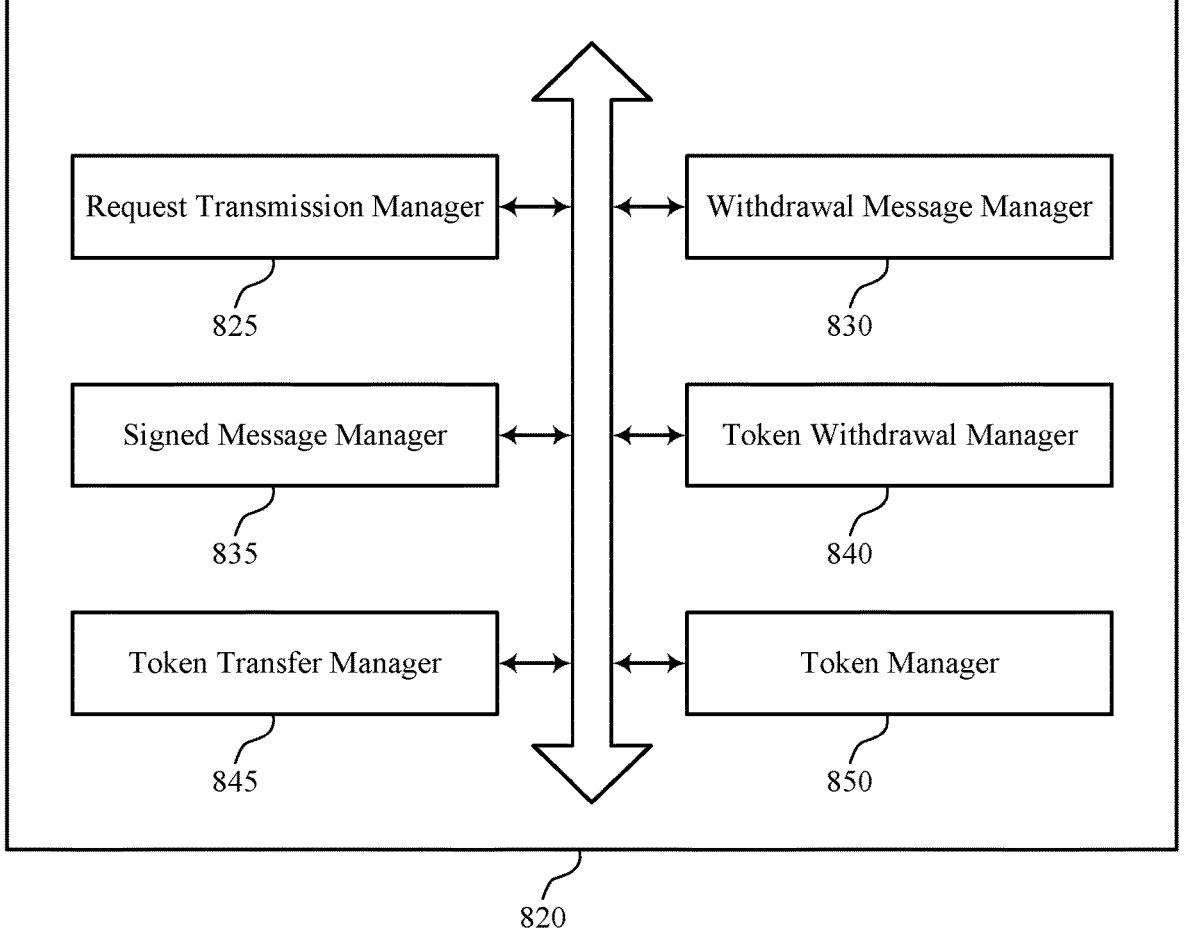
FIG. 8 shows a block diagram of a client application that supports smart contract enabled user account access in accordance with aspects of the present disclosure.

FIG. 8 shows a block diagram 800 of a client application 820 that supports smart contract enabled user account access in accordance with aspects of the present disclosure. The client application 820 may be an example of aspects of a client application or a client application 720, or both, as described herein. The client application 820, or various components thereof, may be an example of means for performing various aspects of smart contract enabled user account access as described herein. For example, the client application 820 may include a request transmission manager 825, a withdrawal message manager 830, a signed message manager 835, a token withdrawal manager 840, a token transfer manager 845, a token manager 850, or any combination thereof. Each of these components may communicate, directly or indirectly, with one another (e.g., via one or more buses, communications links, communications interfaces, or any combination thereof).

The client application 820 may support performing blockchain messages using off-chain accounts in accordance with examples as disclosed herein. The request transmission manager 825 may be configured as or otherwise support a means for transmitting, from a client application to a custodial token platform, a request to use a first amount of one or more tokens associated with a user account at the custodial token platform for transacting with a blockchain address via a blockchain network. The withdrawal message manager 830 may be configured as or otherwise support a means for receiving, from the custodial token platform after transmitting the request, a withdrawal message that is signed by a key associated with the custodial token platform. The signed message manager 835 may be configured as or otherwise support a means for broadcasting, via the blockchain network, a message comprising the signed withdrawal message, wherein the message is configured to cause, within a single message on the blockchain network. The token withdrawal manager 840 may be configured as or otherwise support a means for withdrawal of the first amount of the one or more tokens from a first smart contract address associated with the custodial token platform to a second smart contract address associated with a user of the user account. The token transfer manager 845 may be configured as or otherwise support a means for transfer of a second amount of one or more tokens from the second smart contract address to the blockchain address. The token manager 850 may be configured as or otherwise support a means for wherein confirmation of the transfer occurs prior to the user account being deducted the first amount of the one or more tokens at the custodial token platform.

In some examples, the first amount withdrawn from the first smart contract address comprises message fees associated with the transfer of the second amount to the blockchain address. In some examples, the second amount is supplied by the second smart contract address.

In some examples, the first amount withdrawn from the first smart contract address comprises the second amount transferred to the blockchain address and. In some examples, the second smart contract address supplies message fees associated with transacting with the blockchain address.

In some examples, the first amount withdrawn from the first smart contract address comprises both the second amount transferred to the blockchain address and message fees associated with transfer of the second amount to the blockchain address.

In some examples, the request causes the custodial token platform to restrict at least the first amount associated with the user account at the custodial token platform from being exchanged or transmitted until confirmation of the transfer.

In some examples, the message is transmitted to a message bundler on the blockchain network. In some examples, a field of the message comprises an identifier for the first smart contract address and the signed withdrawal message to facilitate the withdrawal and the transfer.

In some examples, the request causes the second smart contract address to be deployed by the custodial token platform.

In some examples, the message causes transfer of a non-fungible token from the blockchain address to the second smart contract address associated with the user account.

Figure 9:
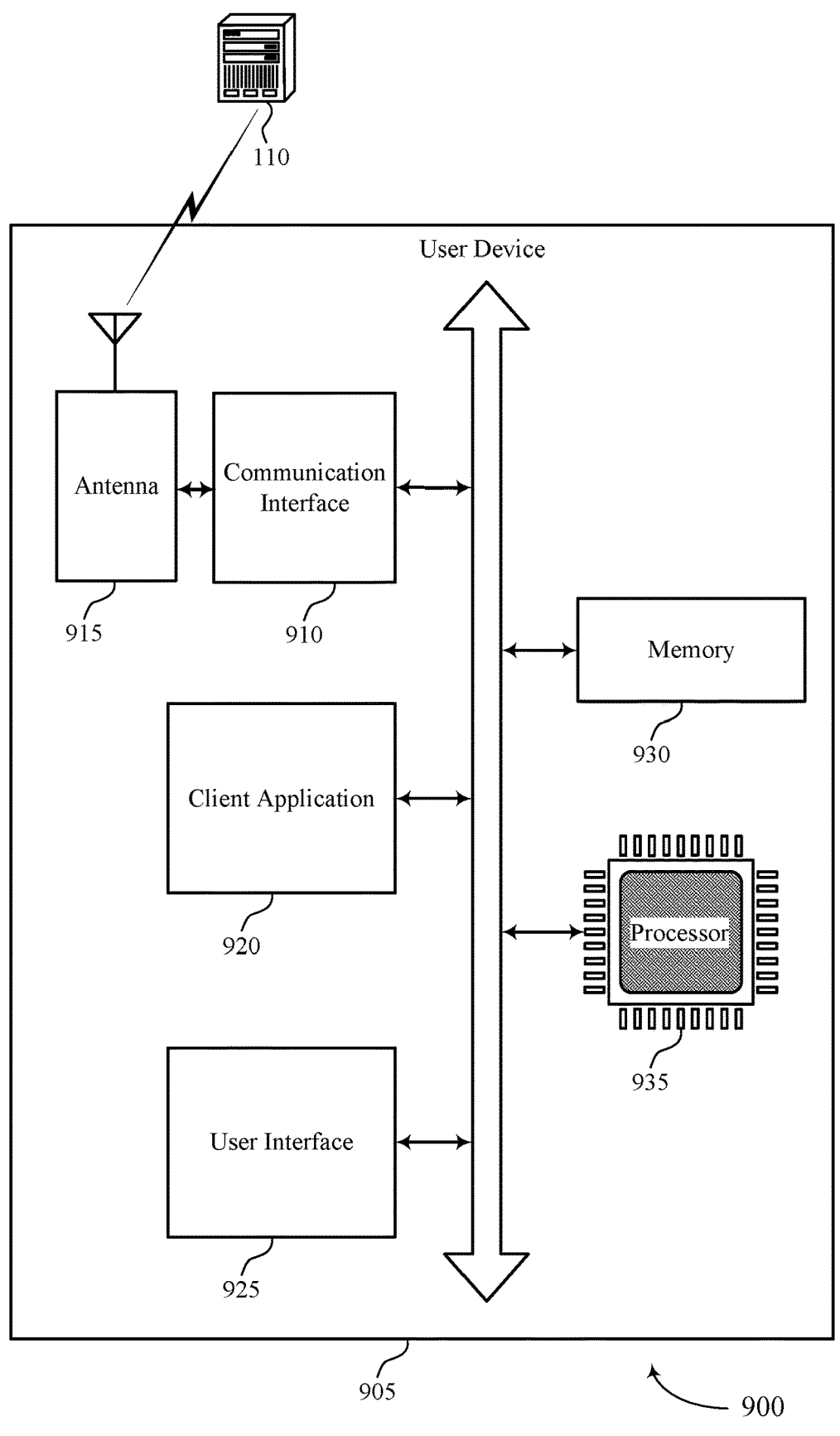
FIG. 9 shows a diagram of a system including a device that supports smart contract enabled user account access in accordance with aspects of the present disclosure.

FIG. 9 shows a diagram of a system 900 including a device 905 that supports smart contract enabled user account access in accordance with aspects of the present disclosure. The device 905 may be an example of or include components of a device 705 as described herein. The device 905 may include components for bi-directional voice and data communications including components for transmitting and receiving communications, such as a client application 920, a communication interface 910, one or more antennas 915, a user interface component 925, at least one memory 930, and at least one processor 935. These components may be in electronic communication or otherwise coupled. Each of these components may communicate, directly or indirectly, with one another (e.g., via one or more buses, communications links, communications interfaces, or any combination thereof).

The communication interface 910 may manage input and output signals for the device 905 via the antenna 915. For example, the communication interface 910 may enable the user device 905 to exchange information (e.g., input information, output information, or both) with other systems or devices, such as custodial token platform 110 (e.g., supported by one or more servers), via one or more wired or wireless communication links. The communication interface 910 may also utilize or interact with antenna 915 to support communication with other systems or devices. In some cases, the communication interface 910 may represent a physical connection or port to an external peripheral, such as a hardware wallet device. In some cases, the communication interface 910 may utilize an operating system such as iOS®, ANDROID®, MS-DOS®, MS-WINDOWS®, OS/2®, UNIX®, LINUX®, or another known operating system. The communication interface 910 may be implemented as part of the processor 935.

In some cases, the device 905 may include a single antenna 915. However, in some other cases, the device 905 may have more than one antenna 915, which may be capable of concurrently transmitting or receiving multiple wireless transmissions. The communication interface 910 may communicate bi-directionally, via the one or more antennas 915, wired, or wireless links as described herein. For example, the communication interface 910 may represent a wireless transceiver and may communicate bi-directionally with another wireless transceiver. The communication interface 910 may also include a modem to modulate the packets, to provide the modulated packets to one or more antennas 915 for transmission, and to demodulate packets received from the one or more antennas 915.

The user interface component 925 may represent or interact with a keyboard, a mouse, a touchscreen, a microphone, or a similar device or component. In some cases, a user may interact with the user interface component 925. In other cases, the user interface component 925 may operate automatically without user interaction. The user interface component 925 may display or output information such as information received from other systems or devices or information to be transmitted to other systems or devices.

The memory 930 may include RAM and ROM. The memory 930 may store computer-readable, computer-executable software including instructions that, when executed, cause at least one processor 935 to perform various functions described herein. In some cases, the memory 930 may contain, among other things, a BIOS which may control basic hardware or software operation such as the interaction with peripheral components or devices. The memory 930 may be an example of a single memory or multiple memories. For example, the user device 905 may include one or more memories 930.

The processor 935 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 935 may be configured to operate a memory array using a memory controller. In other cases, a memory controller may be integrated into the processor 935. The processor 935 may be configured to execute computer-readable instructions stored in at least one memory 930 to perform various functions (e.g., functions or tasks supporting a method and system for smart contract enabled user account access). Though a single processor 935 is depicted in the example of FIG. 9, it is to be understood that the user device 905 may include any quantity of one or more of processors 935 and that a group of processors 935 may collectively perform one or more functions ascribed herein to a processor, such as the processor 935. The processor 935 may be an example of a single processor or multiple processors. For example, the device 905 may include one or more processors 935.

The client application 920 may support performing blockchain messages using off-chain accounts in accordance with examples as disclosed herein. For example, the client application 920 may be configured as or otherwise support a means for transmitting, from a client application to a custodial token platform, a request to use a first amount of one or more tokens associated with a user account at the custodial token platform for transacting with a blockchain address via a blockchain network. The client application 920 may be configured as or otherwise support a means for receiving, from the custodial token platform after transmitting the request, a withdrawal message that is signed by a key associated with the custodial token platform. The client application 920 may be configured as or otherwise support a means for broadcasting, via the blockchain network, a message comprising the signed withdrawal message, wherein the message is configured to cause, within a single message on the blockchain network. The client application 920 may be configured as or otherwise support a means for withdrawal of the first amount of the one or more tokens from a first smart contract address associating with the custodial token platform to a second smart contract address associated with a user of the user account. The client application 920 may be configured as or otherwise support a means for transfer of a second amount of one or more tokens from the second smart contract address to the blockchain address. The client application 920 may be configured as or otherwise support a means for confirmation of the transfer occurring prior to the user account being deducted the first amount of the one or more tokens at the custodial token platform.

By including or configuring the client application 920 in accordance with examples as described herein, the device 905 may support techniques for improved user experience related to reduced operations when transferring funds for a transaction or to pay gas associated with the transaction.

The client application 920 may include an application (e.g., "app"), program, software, extension, or other component which is configured to facilitate communications with a custodial token platform 110 on a server, one or more nodes of a blockchain network 105, other user devices 905, and other devices or systems. For example, the client application 920 may be an application executable on the user device 905, and the client application 920 may be configured to receive data from a custodial token platform 110, transmit data to the custodial token platform 110, process such data, and cause presentation of such data to a user via a user interface component 925. The client application 920 may be an example of a wallet application, a wallet device, or both, and may be associated with a wallet address and may access or use a private key to sign messages to facilitate transfer of crypto tokens, messages, transactions, or the like via a blockchain distributed data store.

FIG. 10 shows a flowchart illustrating a method 1000 that supports smart contract enabled user account access in accordance with aspects of the present disclosure. The operations of the method 1000 may be implemented by a user device or its components as described herein. For example, the operations of the method 1000 may be performed by a user device as described with reference to FIGS. 1 through 9. In some examples, a user device may execute a set of instructions to control the functional elements of the user device to perform the described functions. Additionally, or alternatively, the user device may perform aspects of the described functions using special-purpose hardware.

At 1005, the method may include transmitting, from a client application to a custodial token platform, a request to use a first amount of one or more tokens associated with a user account at the custodial token platform for transacting with a blockchain address via a blockchain network. The operations of 1005 may be performed in accordance with examples as disclosed herein. In some examples, aspects of the operations of 1005 may be performed by a request transmission manager 825 as described with reference to FIG. 8.

At 1010, the method may include receiving, from the custodial token platform after transmitting the request, a withdrawal message that is signed by a key associated with the custodial token platform. The operations of 1010 may be performed in accordance with examples as disclosed herein. In some examples, aspects of the operations of 1010 may be performed by a withdrawal message manager 830 as described with reference to FIG. 8.

At 1015, the method may include broadcasting, via the blockchain network, a message comprising the signed withdrawal message, wherein the message is configured to cause, within a single message on the blockchain network withdrawal of the first amount of the one or more tokens from a first smart contract address associated with the custodial token platform to a second smart contract address associated with a user of the user account, and transfer of a second amount of one or more tokens from the second smart contract address to the blockchain address. In some examples, confirmation of the transfer occurs prior to the user account being deducted the first amount of the one or more tokens at the custodial token platform. The operations of 1015 may be performed in accordance with examples as disclosed herein. In some examples, aspects of the operations of 1015 may be performed by a signed message manager 835 as described with reference to FIG. 8.

The method may include withdrawal of the first amount of the one or more tokens from a first smart contract address associated with the custodial token platform to a second smart contract address associated with a user of the user account. The operations may be performed in accordance with examples as disclosed herein. In some examples, aspects of the operations may be performed by a token withdrawal manager 840 as described with reference to FIG. 8.

The method may include transfer of a second amount of one or more tokens from the second smart contract address to the blockchain address. The operations may be performed in accordance with examples as disclosed herein. In some examples, aspects of the operations may be performed by a token transfer manager 845 as described with reference to FIG. 8.

The method may include confirmation of the transfer occurring prior to the user account being deducted the first amount of the one or more tokens at the custodial token platform. The operations may be performed in accordance with examples as disclosed herein. In some examples, aspects of the operations may be performed by a token manager 850 as described with reference to FIG. 8.

A method for performing blockchain messages using off-chain accounts by an apparatus is described. The method may include transmitting, from a client application to a custodial token platform, a request to use a first amount of one or more tokens associated with a user account at the custodial token platform for transacting with a blockchain address via a blockchain network, receiving, from the custodial token platform after transmitting the request, a withdrawal message that is signed by a key associated with the custodial token platform, broadcasting, via the blockchain network, a message comprising the signed withdrawal message, wherein the message is configured to cause, within a single message on the blockchain network, withdrawal of the first amount of the one or more tokens from a first smart contract address associated with the custodial token platform to a second smart contract address associated with a user of the user account, transfer of a second amount of one or more tokens from the second smart contract address to the blockchain address, and wherein confirmation of the transfer occurs prior to the user account being deducted the first amount of the one or more tokens at the custodial token platform.

An apparatus for performing blockchain messages using off-chain accounts is described. The apparatus may include one or more memories storing processor executable code, and one or more processors coupled with the one or more memories. The one or more processors may individually or collectively be operable to execute the code to cause the apparatus to transmit, from a client application to a custodial token platform, a request to use a first amount of one or more tokens associated with a user account at the custodial token platform for transacting with a blockchain address via a blockchain network, receive, from the custodial token platform after transmitting the request, a withdrawal message that is signed by a key associated with the custodial token platform, broadcast, via the blockchain network, a message comprising the signed withdrawal message, wherein the message is configured to cause, within a single message on the blockchain network, withdrawal of the first amount of the one or more tokens from a first smart contract address associated with the custodial token platform to a second smart contract address associated with a user of the user account, transfer of a second amount of one or more tokens from the second smart contract address to the blockchain address, and wherein confirmation of the transfer occur prior to the user account being deducted the first amount of the one or more tokens at the custodial token platform.

Another apparatus for performing blockchain messages using off-chain accounts is described. The apparatus may include means for transmitting, from a client application to a custodial token platform, a request to use a first amount of one or more tokens associated with a user account at the custodial token platform for transacting with a blockchain address via a blockchain network, means for receiving, from the custodial token platform after transmitting the request, a withdrawal message that is signed by a key associated with the custodial token platform, means for broadcasting, via the blockchain network, a message comprising the signed withdrawal message, wherein the message is configured to cause, within a single message on the blockchain network, means for withdrawal of the first amount of the one or more tokens from a first smart contract address associated with the custodial token platform to a second smart contract address associated with a user of the user account, means for transfer of a second amount of one or more tokens from the second smart contract address to the blockchain address, and means for confirmation of the transfer occurs prior to the user account being deducted the first amount of the one or more tokens at the custodial token platform.

A non-transitory computer-readable medium storing code for performing blockchain messages using off-chain accounts is described. The code may include instructions executable by one or more processors to transmit, from a client application to a custodial token platform, a request to use a first amount of one or more tokens associated with a user account at the custodial token platform for transacting with a blockchain address via a blockchain network, receive, from the custodial token platform after transmitting the request, a withdrawal message that is signed by a key associated with the custodial token platform, broadcast, via the blockchain network, a message comprising the signed withdrawal message, wherein the message is configured to cause, within a single message on the blockchain network, withdrawal of the first amount of the one or more tokens from a first smart contract address associated with the custodial token platform to a second smart contract address associated with a user of the user account, transfer of a second amount of one or more tokens from the second smart contract address to the blockchain address, and wherein confirmation of the transfer occur prior to the user account being deducted the first amount of the one or more tokens at the custodial token platform.

In some examples of the method, apparatus, and non-transitory computer-readable medium described herein, the first amount withdrawn from the first smart contract address comprises message fees associated with the transfer of the second amount to the blockchain address and the second amount may be supplied by the second smart contract address.

In some examples of the method, apparatus, and non-transitory computer-readable medium described herein, the first amount withdrawn from the first smart contract address comprises the second amount transferred to the blockchain address and the second smart contract address supplies message fees associated with transacting with the blockchain address.

In some examples of the method, apparatus, and non-transitory computer-readable medium described herein, the first amount withdrawn from the first smart contract address comprises both the second amount transferred to the blockchain address and message fees associated with transfer of the second amount to the blockchain address.

In some examples of the method, apparatus, and non-transitory computer-readable medium described herein, the request causes the custodial token platform to restrict at least the first amount associated with the user account at the custodial token platform from being exchanged or transmitted until confirmation of the transfer.

In some examples of the method, apparatus, and non-transitory computer-readable medium described herein, the message may be transmitted to a message bundler on the blockchain network and a field of the message comprises an identifier for the first smart contract address and the signed withdrawal message to facilitate the withdrawal and the transfer.

In some examples of the method, apparatus, and non-transitory computer-readable medium described herein, the request causes the second smart contract address to be deployed by the custodial token platform.

In some examples of the method, apparatus, and non-transitory computer-readable medium described herein, the message causes transfer of a non-fungible token from the blockchain address to the second smart contract address associated with the user account.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for performing blockchain messages using off-chain accounts, comprising:

withdrawing funds from a user account associated with a custodial token platform to transfer the funds from a first smart contract address associated with a user of the user account to a blockchain address in a single-step transaction, wherein completion of the single-step transaction occurs even when the first smart contract address has an amount of one or more tokens less than a first cost associated with the single-step transaction; and processing a withdrawal message signed by a key associated with the custodial token platform, wherein the signed withdrawal message causes:

withdrawal of a first amount of the one or more tokens from the first smart contract address associated with the custodial token platform to a second smart contract address associated with the user of the user account, and transfer of a second amount of one or more tokens from the second smart contract address to the blockchain address, wherein confirmation of the transfer occurs prior to the user account being deducted the first amount of the one or more tokens at the custodial token platform.

2. The method of claim 1, wherein:

the first amount withdrawn from the first smart contract address comprise message fees associated with the transfer of the second amount to the blockchain address; and the second amount is supplied by the second smart contract address.

3. The method of claim 1, wherein:

the first amount withdrawn from the first smart contract address comprises the second amount transferred to the blockchain address; and the second smart contract address supplies message fees associated with transacting with the blockchain address.

4. The method of claim 1, wherein the first amount withdrawn from the first smart contract address comprises both the second amount transferred to the blockchain address and message fees associated with transfer of the second amount to the blockchain address.

5. The method of claim 1, wherein the custodial token platform restricts at least the first amount associated with the user account at the custodial token platform from being exchanged or transmitted until the confirmation of the transfer.

6. The method of claim 1, wherein:

the withdrawal message is transmitted to a message bundler on a blockchain network, and a field of the withdrawal message comprises an identifier for the first smart contract address and the signed withdrawal message to facilitate the withdrawal and the transfer.

7. The method of claim 1, further comprising:

transmitting, from a client application to the custodial token platform, a request that causes the second smart contract address to be deployed by the custodial token platform.

8. The method of claim 1, wherein the withdrawal message causes transfer of a non-fungible token from the blockchain address to the second smart contract address associated with the user account.

9. An apparatus for performing blockchain messages using off-chain accounts, comprising:

one or more memories storing processor-executable code; and one or more processors coupled with the one or more memories and individually or collectively operable to execute the code to cause the apparatus to:

withdraw funds from a user account associated with a custodial token platform to transfer the funds from a first smart contract address associated with a user of the user account to a blockchain address in a single-step transaction, wherein completion of the single-step transaction occurs even when the first smart contract address has an amount of one or more tokens less than a first cost associated with the single-step transaction; and process a withdrawal message signed by a key associated with the custodial token platform, wherein the signed withdrawal message causes:

withdrawal of a first amount of the one or more tokens from the first smart contract address associated with the custodial token platform to a second smart contract address associated with the user of the user account, and transfer of a second amount of one or more tokens from the second smart contract address to the blockchain address, wherein confirmation of the transfer occurs prior to the user account being deducted the first amount of the one or more tokens at the custodial token platform.

10. The apparatus of claim 9, wherein:

the first amount withdrawn from the first smart contract address comprise message fees associated with the transfer of the second amount to the blockchain address; and the second amount is supplied by the second smart contract address.

11. The apparatus of claim 9, wherein:

the first amount withdrawn from the first smart contract address comprises the second amount transferred to the blockchain address; and the second smart contract address supplies message fees associated with transacting with the blockchain address.

12. The apparatus of claim 9, wherein the first amount withdrawn from the first smart contract address comprises both the second amount transferred to the blockchain address and message fees associated with transfer of the second amount to the blockchain address.

13. The apparatus of claim 9, wherein the custodial token platform restricts at least the first amount associated with the user account at the custodial token platform from being exchanged or transmitted until the confirmation of the transfer.

14. The apparatus of claim 9, wherein:

the withdrawal message is transmitted to a message bundler on a blockchain network; and a field of the withdrawal message comprises an identifier for the first smart contract address and the signed withdrawal message to facilitate the withdrawal and the transfer.

15. The apparatus of claim 9, wherein the one or more processors are further operable to execute the code to cause the apparatus to:

transmit, from a client application to the custodial token platform, a request that causes the second smart contract address to be deployed by the custodial token platform.

16. The apparatus of claim 9, wherein the withdrawal message causes transfer of a non-fungible token from the blockchain address to the second smart contract address associated with the user account.

17. A non-transitory computer-readable medium storing code for performing blockchain messages using off-chain accounts, the code comprising instructions executable by one or more processors to:

withdraw funds from a user account associated with a custodial token platform to transfer the funds from a first smart contract address associated with a user of the user account to a blockchain address in a single-step transaction, wherein completion of the single-step transaction occurs even when the first smart contract address has an amount of one or more tokens less than a first cost associated with the single-step transaction; and process a withdrawal message signed by a key associated with the custodial token platform, wherein the signed withdrawal message causes:

withdrawal of a first amount of the one or more tokens from the first smart contract address associated with the custodial token platform to a second smart contract address associated with the user of the user account, and transfer of a second amount of one or more tokens from the second smart contract address to the blockchain address, wherein confirmation of the transfer occurs prior to the user account being deducted the first amount of the one or more tokens at the custodial token platform.

18. The non-transitory computer-readable medium of claim 17, wherein:

the first amount withdrawn from the first smart contract address comprise message fees associated with the transfer of the second amount to the blockchain address; and the second amount is supplied by the second smart contract address.

19. The non-transitory computer-readable medium of claim 17, wherein:

the first amount withdrawn from the first smart contract address comprises the second amount transferred to the blockchain address; and the second smart contract address supplies message fees associated with transacting with the blockchain address.

20. The non-transitory computer-readable medium of claim 17, wherein the first amount withdrawn from the first smart contract address comprises both the second amount transferred to the blockchain address and message fees associated with transfer of the second amount to the blockchain address.

* * * * *